(12) United States Patent
Miller

(10) Patent No.: US 9,672,205 B2
(45) Date of Patent: Jun. 6, 2017

(54) METHODS AND SYSTEMS RELATED TO INFORMATION EXTRACTION

(71) Applicant: CXENSE ASA, Oslo (NO)

(72) Inventor: Scott Miller, Waban, MA (US)

(73) Assignee: CXENSE ASA, Oslo (NO)

( * ) Notice: Subject to any disclaimer, the term of this patent is extended or adjusted under 35 U.S.C. 154(b) by 0 days.

(21) Appl. No.: 15/005,403

(22) Filed: Jan. 25, 2016

(65) Prior Publication Data

US 2016/0140104 A1    May 19, 2016

Related U.S. Application Data

(63) Continuation of application No. 13/447,526, filed on Apr. 16, 2012, now abandoned.

(51) Int. Cl.
  *G06F 17/30* (2006.01)
  *G06F 17/27* (2006.01)

(52) U.S. Cl.
  CPC .......... *G06F 17/278* (2013.01); *G06F 17/271* (2013.01)

(58) Field of Classification Search
  None
  See application file for complete search history.

(56) References Cited

U.S. PATENT DOCUMENTS

| | | | | |
|---|---|---|---|---|
| 5,963,940 A | * | 10/1999 | Liddy | G06F 17/30654 |
| 6,026,388 A | * | 2/2000 | Liddy | G06F 17/30654 |
| 6,052,682 A | * | 4/2000 | Miller | G06F 17/30985 |
| 6,311,152 B1 | * | 10/2001 | Bai | G06F 17/277 704/251 |
| 6,606,625 B1 | * | 8/2003 | Muslea | G06F 17/27 |
| 6,892,189 B2 | * | 5/2005 | Quass | G06F 17/30893 701/1 |
| 6,950,753 B1 | * | 9/2005 | Rzhetsky | G06F 19/12 702/19 |
| 7,149,687 B1 | * | 12/2006 | Gorin | G10L 15/063 704/243 |
| 7,197,449 B2 | * | 3/2007 | Hu | G06F 17/278 704/1 |
| 7,292,976 B1 | * | 11/2007 | Hakkani-Tur | G06F 17/277 704/231 |
| 2004/0111253 A1 | * | 6/2004 | Luo | G06F 17/2715 704/4 |
| 2004/0205482 A1 | * | 10/2004 | Basu | G06F 17/241 715/201 |
| 2007/0067280 A1 | * | 3/2007 | Zhou | G06F 17/278 |

OTHER PUBLICATIONS

Bikel, Daniel M., et al., "Nymble: a high-performance learning name-finder." Proceedings of the fifth conference on Applied natural language processing. Association for Computational Linguistics, 1997.*

(Continued)

*Primary Examiner* — Jialong He
(74) *Attorney, Agent, or Firm* — Tarter Krinsky & Drogin LLP

(57) ABSTRACT

The invention relates to information extraction systems having discriminative models which utilize hierarchical cluster trees and active learning to enhance training.

15 Claims, 8 Drawing Sheets

(56) References Cited

OTHER PUBLICATIONS

Florian, Radu, et al., "Named entity recognition through classifier combination." Proceedings of the seventh conference on Natural language learning at HLT-NAACL 2003—vol. 4. Association for Computational Linguistics, 2003.*

Miller, Scott, Jethran Guinness, and Alex Zamanian. "Name Tagging with Word Clusters and Discriminative Training." HLT-NAACL. vol. 4. May 2-7, 2004.*

Shen, Dan, et al., "Multi-criteria-based active learning for named entity recognition." Proceedings of the 42nd Annual Meeting on Association for Computational Linguistics. Association for Computational Linguistics, 2004.*

\* cited by examiner

400

| | A | B | C | D | E | F |
|---|---|---|---|---|---|---|
| | George | Bush | went | to | New | York |
| 1 | NonSTART | NonSTART | NonSTART | NonSTART | NonSTART | NonSTART |
| 2 | PersonSTART | PersonSTART | PersonSTART | PersonSTART | PersonSTART | PersonSTART |
| 3 | LocationSTART | LocationSTART | LocationSTART | LocationSTART | LocationSTART | LocationSTART |
| 4 | OrgSTART | OrgSTART | OrgSTART | OrgSTART | OrgSTART | OrgSTART |
| 5 | GPESTART | GPESTART | GPESTART | GPESTART | GPESTART | GPESTART |
| 6 | NoneCONT | NoneCONT | NoneCONT | NoneCONT | NoneCONT | NoneCONT |
| 7 | PersonCONT | PersonCONT | PersonCONT | PersonCONT | PersonCONT | PersonCONT |
| 8 | LocationCONT | LocationCONT | LocationCONT | LocationCONT | LocationCONT | LocationCONT |
| 9 | OrgCONT | OrgCONT | OrgCONT | OrgCONT | OrgCONT | OrgCONT |
| 10 | GPECONT | GPECONT | GPECONT | GPECONT | GPECONT | GPECONT |

FIG. 4

QuickLearn SampleEnglishProject

File   Project   Action

Annotation   Decoding   Scoring (o) Clear
604
Tags

In an Oct. 19 review of "The Misanthrope" at Chicago's Goodman
Theater ("Revitalized Classics Take the Stage in the Windy City,
"Leisure & Arts"), the role of Celimene, played by Kim Cattrall, was
mistakenly attributed to Christina Haag. Ms. Haag plays Elianti.
Roll-Royce Motor Cars Inc. said it expect its U.S. Sales to remain
steady as about 1,200 cars in 1990.
602

Skip Sentence

Move to Inbox

Move to Outbox

Train 610

Inbox (44)          Remove          Outbox (7)          Total this session (7)

| In an Oct 19 review of "The Misanthrope | John A. Conlon, Jr., 45, was named a managing |
| it raised financing of 300 billion lire for t | Milton B. Hollander, 60 years old, was named c |
| Giovanni Agnelli & Co., which was form | But nonetheless U.S. Companies might be more |
| The new S&L bailout law allows $50 bill | But the government's action, which caught Jagu |
| "I'm not going to look stupid," vows form | Eventually, Mr. Green testified, he began ducki |
| 606 | 608 |

Suggested action: Annotate data

FIG. 6

METHODS AND SYSTEMS RELATED TO INFORMATION EXTRACTION

CROSS-REFERENCE TO RELATED APPLICATIONS

This application is a continuation of U.S. patent application Ser. No. 13/447,526, filed on Apr. 16, 2012, which is a divisional application of U.S. patent application Ser. No. 11/411,206, filed Apr. 24, 2006, entitled "Methods and systems relating to information extraction", which claims priority to U.S. Provisional application No. 60/678,029, filed May 5, 2005. The entire teachings of the above applications are incorporated herein by reference in its entirety for all purposes.

BACKGROUND OF THE INVENTION

The invention relates in general to the field of information extraction, and more particularly to methods of training a named entity identification and classification system.

Information extraction systems are a class of tools designed to automatically extract useful information from media, such as text transcripts. Information extraction systems include name taggers, entity identifiers, relationship identifiers, and event identifiers. Name taggers identify named entities, such as people, places and organizations in media. Entity identifiers identify linkages between separate words in a media corpus that correspond to the same entity, for example, linkages between a pronoun and a proper name. Relationship identifiers identify relationships, such as employment or location relationships between two entities in a text. For example, a relationship identifier might determine that John Doe works for Business, Inc., Jane Doe is in New York City, etc. Event identifiers identify facts related to entire events. For example, an event identifier might identify a terrorist attack as an event. The event identifier also might link the event to participants in the attack, numbers of casualties, when the attack took place, etc.

Name taggers are trained to identify named entities in text. For example, name taggers are used in the intelligence community to identify intercepted communications related to particular individuals, such as Osama Bin Laden, or places, such as the American Embassy in Cairo. Name taggers can also be used in general search engines and language analysis tools. They also often serve as the foundation for relationship and event identification systems.

Consider the problem of a name tagger extracting named entities from the following text passage:

"George Bush went to New York to speak at the United Nations."

To an English-speaking person, it would likely be clear that "George Bush" corresponds to the name of a person, "New York" is the name of a place and the "United Nations" is the name of a geopolitical entity. However, to a machine, the above sentence includes a number of words that could prove tricky to identify. For example, if a machine were to evaluate each word of the sentence absent any context, the machine might determine that the word "Bush" refers to a plant. Similarly, the words "New", "United", and "Nations" might be difficult for a machine to identify and classify appropriately, as the words have uses other than being a part of named entities.

Information extraction systems can be classified into two general categories, those that are based on generative models and those that are based on discriminative models. When processing input, a generative model assigns a combined probability to the input data and to the possible outputs. For example, in a name tagging problem, a generative model assigns probabilities both to the words being tagged and to the possible tags, themselves. The generative model ensures that the total probability over all possible input-output sequences sums to 1.0. To do so, a generative model is typically organized as a sequence of choices, with the product of the probabilities of those choices yielding the probability for the whole sequence. The model bases these probabilities from processed annotated training data.

A discriminative model, on the other hand, assigns probabilities only to possible outputs for a given input. In a name tagging problem, for example, a discriminative model only assigns probabilities to tag sequences. Discriminative models employ a mechanism to assign scores to each possible prediction, and the scores for all the different possible outputs are then normalized to produce probabilities. Discriminative models do not require that the scores sum to anything in particular before normalization. One approach for deriving these scores manually defines a set of features that characterize tags and their contexts, and then automatically learns a set of weights for those features. The feature weights then determine the model's predicted scores and the resulting probabilities aim to match as closely as possible actual observances of features in annotated training data.

Numerous techniques have been employed in information extraction systems training. Such techniques include various levels of human intervention. One typical training technique includes a human linguist annotating a corpus of text to be used as a training set. This technique can be very time consuming, because manually annotating text is a rather slow process. Another training technique, active learning, involves an information extraction system identifying specific strings of words for a human to annotate. For example, the information extraction system may identify word strings which the information extraction system cannot confidently classify. In a third training technique, an automated system processes a very large body of text without human intervention and derives contextual information based on the frequency of various relative word positions.

SUMMARY OF THE INVENTION

The invention is generally directed to automated information extraction. More particularly, in various embodiments, the invention provides systems and methods relating to more accurate named entity identification and classification. In one aspect, the invention relates to a method of training an information extraction system using a discriminative model to identify and classify words in text.

In one embodiment, the method includes employing a first corpus of annotated text and a hierarchical cluster tree to populate a discriminative information extraction model. The hierarchical cluster tree is indicative of the relative positions of words in a second corpus of text. The method also includes automatically identifying strings of words from the first corpus, the second corpus, or a third corpus which have an ambiguous relationship. For example, the method may identify sentences to which the information extraction system assigns a low confidence score. Alternatively, the method identifies word strings for trainer annotation based on the frequency with which particular words in the word strings appear in the rest of the corpora the method employs to train the information extraction system. The method includes providing the identified strings of words to a trainer for annotation and automatically updating the discriminative information extraction model based on annotations provided by the trainer.

One feature of the method is that populating the discriminative information extraction model includes characterizing words in the model based in part on one or more clusters in the hierarchical cluster tree to which the words belong. Words are also characterized in the discriminative information extraction model based on annotations in the first annotated corpus of text and on annotations added to the identified strings of words by the trainer.

In another embodiment, the method includes generating the hierarchical cluster tree. In one particular implementation, the hierarchical cluster tree is generated based on word bigram statistics corresponding to the occurrences of word bigrams in the second corpus of text. Words identified in the second corpus are iteratively aggregated into clusters based on the bigram occurrence statistics to form a binary tree structure.

In other aspects, the invention relates to systems carrying the methods described above, as well as computer readable media storing instructions for carrying out such methods.

BRIEF DESCRIPTION OF THE DRAWINGS

The system and methods may be better understood from the following illustrative description with reference to the following drawings in which:

FIG. 4 is an illustrative lattice generated as part of the word classification method depicted in FIG. 3, according to an illustrative embodiment of the invention;

FIG. 6 is a computer screenshot of an active learning user interface for use in the active learning process depicted in FIG. 5;

DETAILED DESCRIPTION

To provide an overall understanding of the invention, certain illustrative embodiments will now be described, including a system and a method for training an information extraction system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
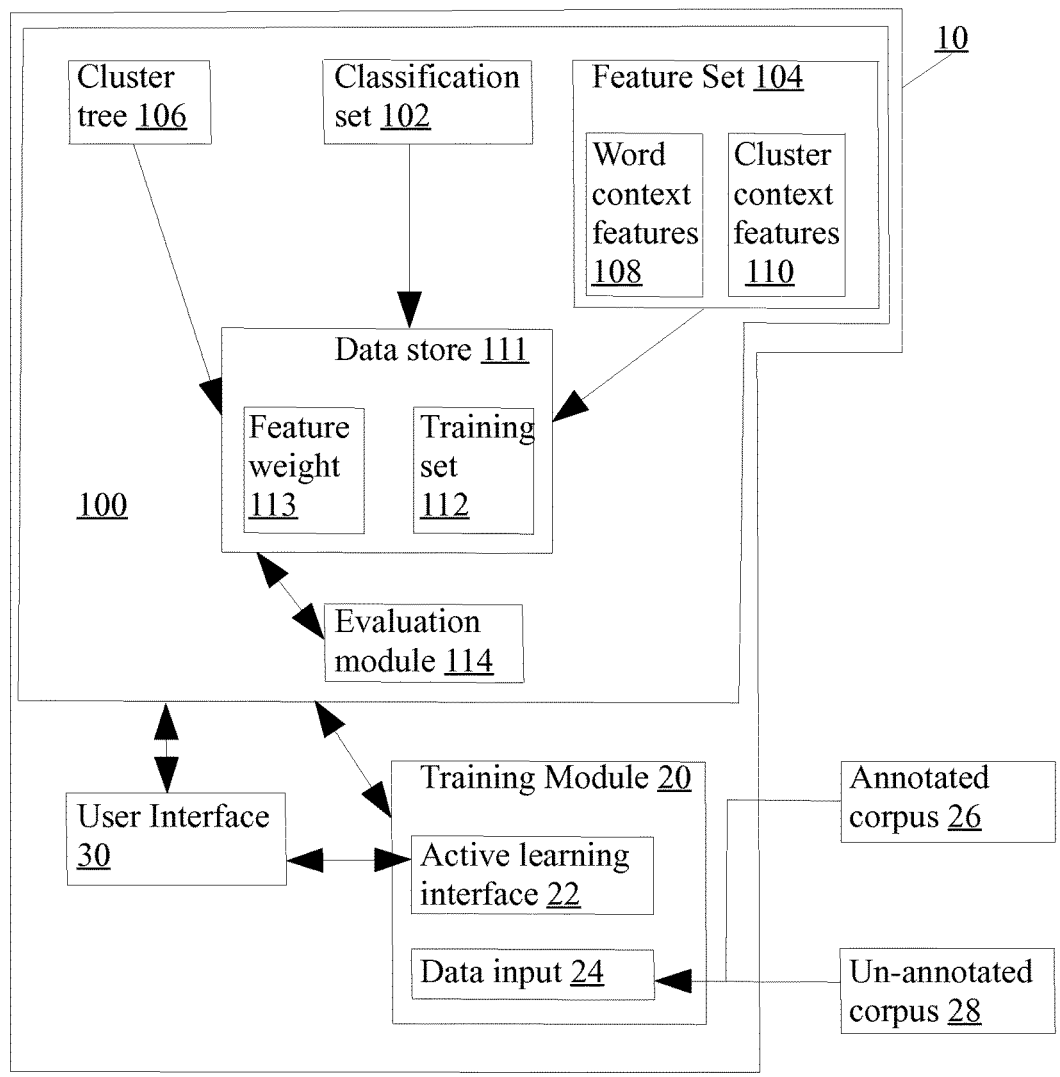
FIG. 1 is a block diagram of an information extraction system according to an illustrative embodiment of the invention.

FIG. 1 is a block diagram of an information extraction system 10 ("the "IE System 10"), according to an illustrative embodiment of the invention. The IE system 10 includes a discriminative information extraction model 100 ("the model 100"), a training module 20, and a user interface 30. The model 100 and the training module 20 are preferably implemented as computer readable instructions executable on one or more general or special purpose computers. The computer preferably includes a storage device for storing data collected and used by the IE system 10. The user interface 30 includes standard user interface components, such as a keyboard, mouse and keyboard, and external media drive. The computer may also have a network connection for linking to external storage devices and for making the IE system 10 available to act as a server in a client-server configuration. In such a configuration a user at a client computer can request information to be extracted from user-supplied input. The training module includes an active learning user interface 22 and a data input 24, both of which will be described further in relation to FIGS. 5 and 6.

The model 100 includes a classification set 102, a feature set 104, and a cluster tree 106. The classification set 102 includes a plurality of classifications to which words in a sentence can be assigned by the IE system 10. The classifications include Person, Location, Geopolitical Entity, Organization, Date, Time, Percent, and Monetary Amount. In addition, the classification set 102 includes two non-name classifications, None and Null. The None classification refers to words in a sentence that are not part of a named entity, such as most verbs, prepositions, and articles. Null refers to the beginning of a sentence, before the first word, or the end of a sentence, after the last word. Every sentence begins and ends with a Null.

For the non-Null classifications in the classification set 102, the model 100 utilizes two tags, a START tag and a CONT tag. The first word in a series of consecutive words of a single classification is labeled with the START tag. Subsequent consecutive words of that class are labeled with a CONT tag. For example, for the series of words "William Jefferson Clinton", "William" would be labeled as Person-START, and both "Jefferson" and "Clinton" would be labeled as PersonCONT.

The feature set 104 includes a plurality of variables ("features") related to each classification and tag in the model 100. The feature set 104 includes two types of features, word context features 108 and cluster context features 110. Word context features 108 relate to the use of specific words and related classifications. Cluster context features 110 relate to the use of groups of similarly used words ("clusters"), as defined by the cluster tree 106.

In general, a cluster tree, such as cluster tree 106, groups words into hierarchical groups, which have decreasingly similar usage statistics as the groups increase in size. In the illustrative implementation, the usage statistics include the frequencies of word bigrams in a large corpus of un-annotated text. A "bigram" is a pair of consecutive words. The theory behind the usage of the cluster tree 106 in the model 100 is that words which frequently appear near the same words are likely to be themselves similar. For example, the word "Utah" often follows the words "to", "from", and "in", and often precedes "state", "Department", and "weather". "Arizona" likely has a similar usage pattern. The clustering process agglomeratively groups words into clusters with other words whose bigram frequency statistics are similar. This process produces a binary tree with words at the leaves, and internal nodes that represent clusters of similar words. Internal nodes high up in the tree (close to the root)

represent large clusters, while those low down map to smaller ones. In general, the pairwise similarities within the smaller clusters are likely to be greater than those within the larger cluster.

One specific method for generating a cluster tree 106 is described in "Class-Based N-Gram Models of Natural Language" by Brown, et al., published in Computational Linguistics in 1990, the entirety of which is incorporated herein by reference. In brief summary, a table is populated by tallying the number of times each word in the large corpus of un-annotated text precedes each other word in the corpus. Large text corpora that can be used for calculating such tallies are widely available. For example, the British National Corpus contains about 100 million words of mixed text and speech data. The Linguistic Data Consortium distributes corpora in a number of languages. Such corpora might include approximately 100 thousand distinct words that appear frequently enough that useful information can be derived from their use. Thus, to generate a cluster tree 106 from such a corpus, a system would build a 100 thousand by 100 thousand matrix of bigram tallies. Then, words in the matrix are iteratively grouped together into clusters such that the decrease in the average bigram mutual information of the un-annotated corpus resulting from each such grouping is minimized. The grouping continues, in a binary fashion, combining clusters until all words are included in a super group, referred to as the root.

Figure 2:
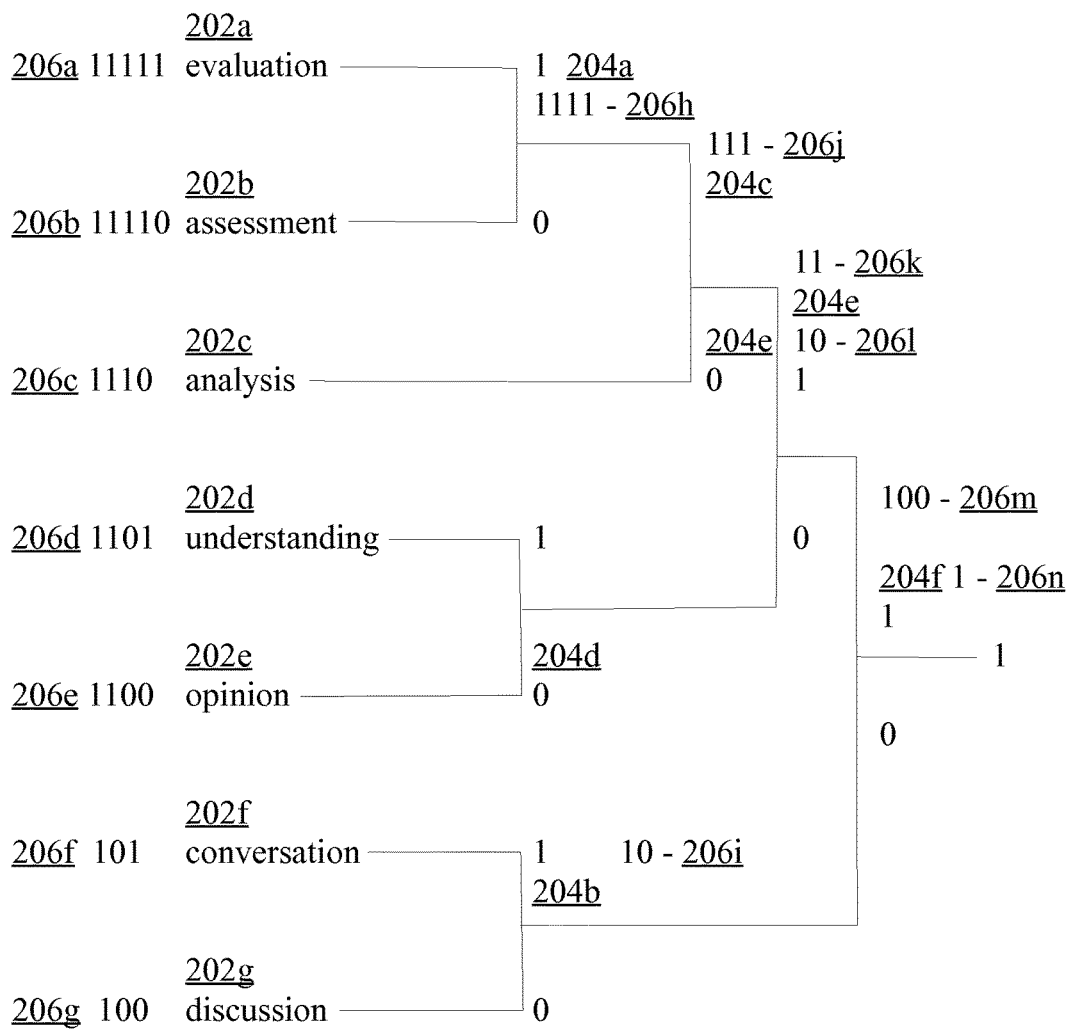
FIG. 2 is a conceptual diagram of a portion of a hierarchical cluster tree as employed by the discriminative information extraction model depicted in FIG. 5, according to an illustrative embodiment of the invention.

FIG. 2 is a conceptual diagram of a portion of an illustrative cluster tree 200, such as cluster tree 106. The cluster tree 200 corresponds to only a small portion of a full cluster tree that would be used in the model 100. The cluster tree 200 includes seven related words 202a-202g (generally "words"). To the far left side of the cluster tree 200, corresponding to the bottom of the cluster tree 200, each word 202a-202g is listed by itself. The intersections of lines connecting the words 202a-202g correspond to clusters 204a-204f (generally "clusters 204"). For example, at a first level of grouping, word 202a, "evaluation", is grouped with word 202b, "assessment", at cluster 204a, and word 202f, "conversation", is grouped with word 202g, "discussion", at cluster 204b. At another level of grouping, word 202c, "analysis", is added to cluster 204a to form cluster 204c. At the right-hand side of the cluster tree 200, all of the depicted words 202a-202g are aggregated into a single cluster, cluster 204f.

To make use of the information captured in the cluster tree 200, words 202 and clusters 204 are identified by unique binary number identifiers 206a-206n (generally "identifier 206") based on their conceptual location in the cluster tree 200. An identifier 206 describes the path one would have to trace through the cluster tree 200 from the root node to the particular word 202 or particular cluster 204. In the illustrated cluster tree 200, moving from the far right along a path to an individual word 202 on the far left, an identifier 206 begins with a "1" and is built by adding a "1" for each time the path branches upward and by adding a "0" each time the path branches downward. For example, word 202c, "analysis", is identified with identifier 206c, "1110"; cluster 204a is identified with identifier 206h, "1111"; and cluster 204b is identified by identifier 206i, "10". Different words 202 in the cluster tree may have different length identifiers 206 depending on how similarly the word 202 is used in the corpus in relation to other words 202.

Tables 1-3 show three different portions of a cluster tree resulting from applying the clustering process described above to a sample large corpus of annotated text. The clustering process grouped words into job words (words having a shared identifier prefix of 1000001101), company names (words having a shared identifier prefix of 1011011100100101), and person names (words having a shared identifier prefix of 101110010000000). Even though the classification is noisy (e.g., the word "genus" appears in the Company Name table) as a result of its being derived without any human annotation or other intervention, the information still proves useful in identifying named entities as will be described below in relation to FIG. 3.

TABLE 1

Job Words
Shared Prefix: 1000001101

| lawyer | 1000001101000 |
| stewardess | 100000110100101 |
| slang | 1000001101010 |
| conspirator | 1000001101011010 |
| mailman | 10000011010111 |
| bookkeeper | 1000001101100010 |
| bouncer | 10000011011000111 |
| janitor | 1000001101100101 |
| lawyer | 1000001101000 |
| stewardess | 100000110100101 |
| slang | 1000001101010 |
| conspirator | 1000001101011010 |

TABLE 2

Company Names
Shared Prefix: 1011011100100101

| Nike | 101101110010010101011100 |
| Maytag | 101101110010010101011010 |
| Generali | 101101110010010101011011 |
| Gap | 101101110010010101011110 |
| Harley-Davidson | 101101110010010101011110 |
| Enfield | 1011011100100101011111110 |
| genus | 1011011100100101011111111 |
| Microsoft | 10110111001001011000 |
| Ventritex | 1011011100100110010 |
| Tractebel | 101101110010010100110 |
| Synopsys | 101101110010010100111 |
| WordPerfect | 101101110010010101001000 |

TABLE 3

Person Names
Shared Prefix: 101110010000000

| John | 101110010000000000 |
| Consuelo | 101110010000000001 |
| Jeffrey | 101110010000000010 |
| Kenneth | 1011100100000001100 |
| Phillip | 1011100100000001010 |
| WILLIAM | 1011100100000001011 |
| Timothy | 1011100100000001110 |
| Terrence | 10111001000000011110 |
| Jerald | 10111001000000011111 |
| Harold | 1011100100000000100 |
| Frederic | 1011100100000000101 |
| Wendell | 10111001000000011 |

Referring back to FIG. 5, the cluster context features 110 allow the model 100 to evaluate multiple levels of similarity between words by comparing characteristics of clusters having similar prefixes of different lengths. For example, the paths for all of the person names, for example, in Table 3, begin with the same 15-bit identifier prefix: 101110010000000. At various hypothetical point in the tree, the cluster tree 106 may partition the names based on gender, national origin, age, or some other characteristic of persons having each name that results in distinct usage patterns of the name in the large corpus of un-annotated text.

Any specified prefix length selects a level of internal nodes in the overall cluster tree 106, which in turn partitions the words into clusters. The prefix length 2, for example, splits the vocabulary into just 2 clusters. Such clusters are much too large to be very informative. On the other hand, a large prefix length like 30 would yield very small clusters. Some areas of the tree may not be 30 levels deep, at all.

One purpose of the cluster tree 106 is to provide information to the model 100 about words that the model 100 has not been trained on. Useful information about a word can only be extracted from clusters that are large enough to include words which have been seen during training. On the other hand, while a very large cluster around a previously unseen word is more likely to include a previously seen word, the degree of similarity between words in a very large cluster may be quite small, thereby yielding little information about the previously unseen word. To take into account such difficulties in selecting an appropriate size cluster from which useful information can be extracted, the model 100 includes cluster context features 110 corresponding to clusters of multiple sizes, as defined by prefixes of varying lengths. In any given case, at least one of the cluster sizes evaluated is likely to yield useful information.

The full feature set 104 used in the illustrative implementation of the model 100 is provided in Table 4. Features 1 through 7 are word context features 108 and the remaining 12 features are cluster context features 110.

TABLE 4

Model 100 Features

1. Tag + PrevTag
2. Tag + CurrWord
3. Tag + CapAndNumFeatureOfCurrWord
4. ReducedTag + CurrWord   //collapse start and continue tags
5. Tag + PrevWord
6. Tag + NextWord
7. Tag + DownCaseCurrWord
8. Tag + Pref8ofCurrWord
9. Tag + Pref12ofCurrWord
10. Tag + Pref16ofCurrWord
11. Tag + Pref20ofCurrWord
12. Tag + Pref8ofPrevWord
13. Tag + Pref12ofPrevWord
14. Tag + Pref16ofPrevWord
15. Tag + Pref20ofPrevWord
16. Tag + Pref8ofNextWord
17. Tag + Pref12ofNextWord
18. Tag + Pref16ofNextWord
19. Tag + Pref20ofNextWord With respect to the word context features 108 (features 1-7), "Tag" refers to a classification tag, as described above, for example, PersonSTART, LocationCONT, etc. "ReducedTag" refers to a general classification, i.e., person, place, location, geopolitical entity, etc., without reference to whether the tag is a START tag or a CONT tag. The PrevTag corresponds to the tag assigned to the previous word. PrevWord refers to the previous word in the sentence. CurrWord refers to the current word being analyzed. NextWord refers to the subsequent word in the sentence. DownCaseCurrWord refers to the lowercase version of the word. CapAndNumFeatureOfCurrWord refers to the presence or absence of capital letters and/or numerals in the current word. With respect to the cluster context features (features 8- 19), prefX refers to the first X bits of the cluster tree identifier of the word in question (current, previous, or next).

A specific instance of a feature, for example, may be {Tag=NoneSTART, CurrWord="dog"}.

The model 100 includes a data store 111 which includes a training set 112 and a feature weight table 113. The training set 112 preferably includes a copy of all annotated text on which the model 100 has been trained. The training set 112 will described in further detail in relation to FIG. 5.

The feature weight table 113 stores weights corresponding to each of the features for each classification and tag in the model 100. Thus, for example, in relation to the first feature, the feature weight table 113 includes weights related to the likelihood that a word tagged as PersonCONT will follow words labeled with each of the other tags. For the second feature, the feature weight table 113 includes weights related to the likelihood that each tag should be applied to each word on which the model 100 was trained. For feature 8, the feature weight table 113 includes weights related to the likelihood that each tag should be applied to words belonging to the clusters defined by each 8 digit binary prefix on which the model 100 was trained. The weights will be described further in relation to FIGS. 3 and 5.

The model 100 includes an evaluation module 114 for determining the proper classification of a given word based on data stored in the feature weight table and in the cluster tree 106. In the illustrative implementation, the evaluation module 114 includes instructions for carrying out the named entity identification method described below in relation to FIG. 3.

Figure 3:
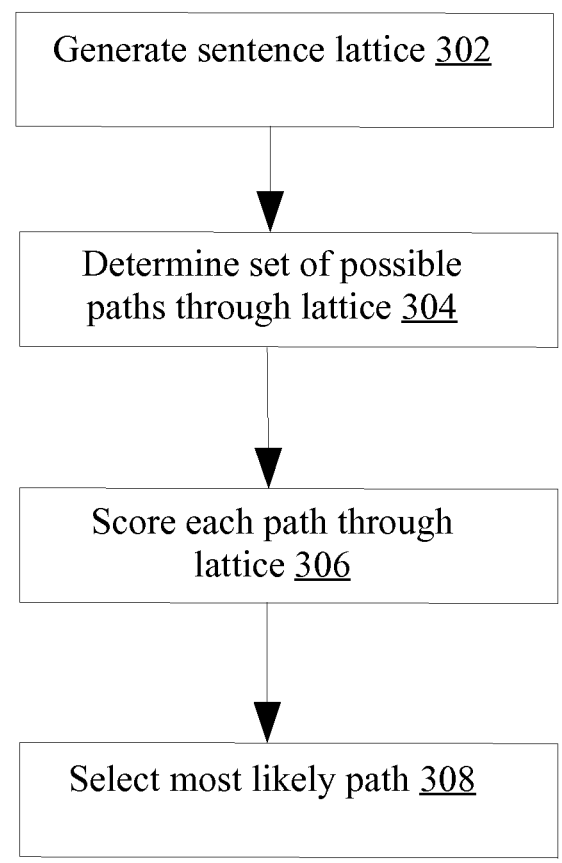
FIG. 3 is a flowchart of a method for classifying words in a string of words, according to an illustrative embodiment of the invention.

FIG. 3 is a flowchart of an illustrative method of identifying named entities 300 in a string of words employed by the evaluation model 100, according to an illustrative embodiment of the invention. First, the evaluation module 114 determines a set of all possible tag sequences for the string of words (step 302). The list of possible sequences can be combined into a lattice structure (step 304). Some tag sequences are logically impossible based upon the rules of the model 100. For example, a CONT tag for a first classification cannot follow a START tag for a second classification, as CONT tags are defined as only following START tags of the same classification (e.g., LocationCONT cannot follow PersonSTART). Such impossible sequences can be left out of the lattice to reduce memory and processing requirements.

FIG. 4 is an abbreviated version of a lattice 400 employed in the method of identifying entities 300 depicted in FIG. 3, according to an illustrative embodiment of the invention. The lattice 400 includes a set of cells 401 corresponding to potential tags for each word and a set of paths 404 connecting the cells. The lattice 400 corresponds to the first part of the sentence discussed above: "George Bush went to New York . . . " ("string 402"). The cells in the set of cells 401 corresponding to the correct tags are bolded and shaded for illustrative purposes. Only two paths 404a and 404b of the many possible paths 404 are illustrated to minimize visual clutter. Specific cells in the set of cells 401 are referenced herein by the row number, 1-10, and column letter, A-F, corresponding to their position in the lattice 400. Each cell corresponds to a word position-tag pairing (a "pairing"). For example, cell A2 corresponds to a pairing of the first word in the string 402 with the tag, PersonSTART. Cell B3 corresponds to a pairing of the second word in the string 402 with the tag LocationSTART.

Referring back to FIG. 3, the evaluation module 114 evaluates each path through the lattice 400 (step 306). The evaluation module 114 bases the evaluation for a path 404 on the sum of the feature weights for each cell in the path 404. For example, for cell B7 for path 404a, the evaluation module 114 retrieves the feature weights from the feature weight table 113 related to the likelihood that the second word in the string 402 should be classified as PersonCONT, assuming the first word in the string 402 was tagged as PersonSTART. For example, the evaluation module 114 retrieves weights corresponding to the following illustrative features: {Tag=PersonCONT, PrevTag=PersonSTART} (feature 1), {Tag=PersonCONT, CurrWord="Bush"} (feature 2), {Tag=PersonCONT, NextWord="went"} (feature 6), {Tag=PersonCONT, Pref8ofPrevWord=10111001} (feature 12), etc.

For evaluating word context feature weights for words that do not appear in the feature weight table 113, the evaluation module substitutes word context feature weights previously determined for a system-defined word, "*RARE*". The *RARE* word feature weights correspond to an agglomeration of weights for words that were detected fewer than a threshold number of times in the training set 112. Such words might be include, for example, unusual surnames or family names or other infrequently used words.

Additional information can be derived regarding words not located in the feature weight table 113 based on the cluster context features 110. By locating the absent word in the cluster tree 106, the evaluation module 114 can retrieve feature weights for the cluster context features 8-11. Moreover, if the word is completely foreign to the model 100, in addition to information that can be derived from the *RARE* feature weights, the feature set 104 includes features related to the previous word in the sequence of words, the subsequent word in the sequence of words, and the previous tag in the path being evaluated.

For example, there is a significant likelihood that when evaluating a string 402, the IE system 10 will come upon a person's name that is unknown to the model 100. However, the IE system 10 can determine that the unknown word refers to a person based on its context. For example, in the sentence fragment "Mr. X said . . . ", where "X" refers to the unknown word, the fact that "X" follows the word "Mr." and precedes the word "said" makes it likely that "X" is the name of a person.

After each cell is evaluated for each path in step 306, the evaluation module 114 selects the best path according to the Viterbi algorithm (step 308). The Viterbi algorithm is well known in the art, described for example, in "Error bounds For Convolutional Codes and an Asymptotically Optimal Decoding Algorithm," by Viterbi., published in IEEE Trans. Information Theory, 1967, the entirety of which is hereby incorporated by reference.

Figure 5:
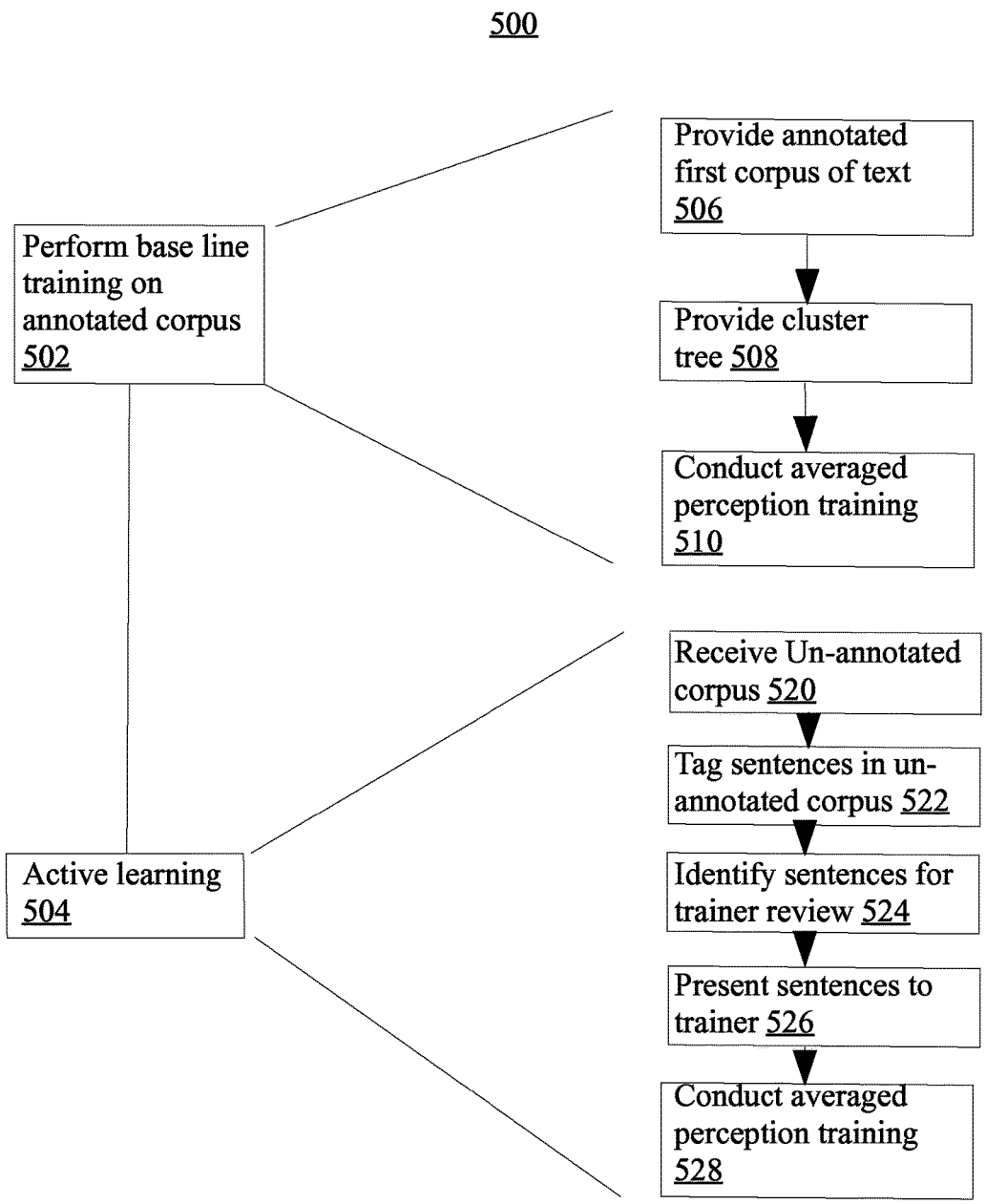
FIG. 5 is a flowchart of a method of training an information extraction system, according to an illustrative embodiment of the invention.

FIG. 5 is a flowchart of a method 500 executed by the training module 20, for training the information extraction model 100 described above, according to an illustrative embodiment of the invention. The training method 500 is based on an averaged perceptron algorithm. The averaged perceptron algorithm is described in further detail in "Discriminative Training for Hidden Markov Models: Theory and Experiments with Perceptron Algorithms" by Michael Collins, published in EMNLP in 2002, the entirety of which is hereby incorporated by reference.

The training method 500 includes two phases, baseline training 502 and active learning 504. In general, the goal of training the model 100 is to populate the model 100 with feature weights that yield accurate detection and classification of named entities in later-analyzed un-annotated text.

The baseline training phase 502 of the training method 500 includes the provision of an annotated corpus of text 26 (step 506) and a cluster tree (step 508) via the data input 24. The annotated corpus of text 26 is labeled either by a human trainer or by another information extraction system already trained with sufficient information to accurately annotate the corpus 26. The annotator labels each word in the annotated corpus 26 with one of the tags described above. The training method can also employ a pre-annotated corpus, used for example, to train other information extraction systems. The size of the annotated corpus 26 may vary. In general, a larger annotated corpus 26 provides better results, though increases in the corpus size provide diminishing returns in performance improvement. Annotating a corpus of text is time consuming and expensive. A trained annotator can annotate on the order of five thousand words per hour. Thus, it would take years for a single human annotator to annotate the large corpora mentioned above. In one implementation, the annotated corpus 26 includes approximately 5,000 to 20,000 words. The cluster tree, as described above, is based on a substantially larger corpus of non-annotated text, including, for example, approximately 100 million to 200 million words.

The training module 20 applies an averaged perceptron algorithm to the annotated corpus 26 (step 510). In carrying out the averaged perceptron algorithm, the training module passes each sentence in the annotated corpus 26 to the evaluation module 114 for tagging, and it stores the annotated sentences in the training set 112. The training module 20 then compares the path of tags selected by the evaluation module 114 (the "predicted path") for each sentence with the path indicated by the annotations in the annotated corpus 26 (the "annotated path"). If the predicted path and the annotated path match, the training module 20 skips to the next sentence. If the predicted path and the annotated path do not match, the training module 20 adjusts the feature weights corresponding to the disparate paths to improve future evaluation module 114 prediction. To adjust the weights, the training module increments the feature weights corresponding to each of the tags in the annotated path and decrements the feature weights corresponding to the each of the tags in the incorrect predicted path. Each pass through a corpus of sentences is referred to as an epoch. The training module may iterate through several epochs, for example, between 1 and 10 epochs, before ending the baseline training phase 502.

To maintain the averaged perceptron, the feature weight table 113 also stores a history of feature weights, as well as the average historical weight of each feature in the feature weight table 113. Thus, if the weight of a feature changes, for example, at the completion of a baseline training epoch or after the completion of an epoch of the active learning phase 504 described below, the training module 20 stores the new weight, and calculates and stores a new average weight for the feature in the feature weight table 113.

After the training module 20 completes the baseline training 502, the training method 500 enters the active learning phase 504. The active learning phase 504 begins with the provision of an un-annotated corpus of text 28 (step 520) via the data input 24. The un-annotated corpus 28 may be a portion of the corpus used to generate the cluster tree 106, or it may be a distinct corpus.

Based on the feature weights established during the baseline training 502, the training module 20 passes each sentence in the un-annotated corpus 28 to the evaluation module 114 for tagging (step 522) according to the entity identification method 300 described above in relation to FIG. 3. While tagging each sentence, the evaluation module 114 calculates a confidence score indicating the confidence the evaluation module 114 has in its tagging decisions for that sentence. In one implementation, the confidence score for a given sentence is proportional to the likelihood determined for the selected path through a corresponding lattice. In a second implementation, the confidence score for a sentence is proportional to the difference in the likelihoods assigned to the two paths through the lattice having the highest likelihood scores. That is, a small difference indicates that the decision made by the evaluation module 114 was relatively close, thereby decreasing the confidence the evaluation module 114 has in its decision.

After the evaluation module 114 tags the sentences in the un-annotated corpus 28 (step 522), the training module 20 selects a subset of the sentences for trainer review (step 524) based on the confidence scores. The training module 20, in one implementation, selects a predetermined number of sentences with the lowest confidence scores. In another implementation, the training module 20 selects all sentences having confidence scores below a threshold value. In still another implementation, the training module 20 selects the sentences having confidence scores that fall in the lowest predetermined percent of confidence scores. In a second set of implementations, the training module 20 selects sentences for trainer annotation (step 524) based on the frequency with which words in each reviewed sentence appear in the training set 112. Once the sentences are selected by the training module 20, the sentences are presented to a trainer for annotation (step 526). In a third set of implementations, the training module 20 selects sentences for trainer annotation (step 524) based on a combination of the confidence scores and frequency with which words in each reviewed sentence appear in the training set 112.

FIG. 6 is a screen shot of an active learning user interface 600 (corresponding to active learning user interface 22 depicted in FIG. 1) for annotating selected sentences, according to an illustrative embodiment of the invention. The active learning user interface 600 provides a graphical user interface for labeling each word in a selected sentence. The active learning user interface 600 includes an annotation region 602 in which sentences are displayed for annotation. The active learning user interface 600 also includes a list of possible tags for each word 604. A user of the active learning user interface 600 annotates each word in a displayed sentence, for example, by dragging a tag from the list of possible tags 604 over a given word. Alternatively, a user can select one or more words in the annotation region 602 and then select an appropriate tag, for example, by clicking on the tag with a mouse. Sentences can be annotated one at a time or in bulk.

The active learning user interface 600 may optionally include an inbox 606 and an outbox 608. The inbox 606 identifies additional sentences to be annotated. Annotated sentences are moved from the annotation region 602 into the outbox 608, and are replaced by new sentences from the inbox 606. After one or more sentences are annotated, a user can select a train button 610 to instruct the training module 20 to update the feature weights (step 528) in the model 100 based on the annotated sentences in the outbox 608. The annotated sentences are then added to the training set 112.

To update the feature weights, after the trainer has annotated the selected sentences, the training module applies the averaged perceptron algorithm to the new data (step 528). In one implementation, the training module applies the averaged perceptron algorithm only to the newly tagged sentences, updating the previously determined feature weights and adding features not previously identified. In a second implementation, the training module cancels the weights derived from the baseline training and applies the averaged perceptron algorithm to the now expanded training set 112.

As described above in relation to the baseline training phase 502, the averaged perceptron algorithm manipulates feature weights in response to detecting predicted paths that fail to match the annotated paths in the training set 112. Also as described above, the training module 20 may iterate through the averaged perceptron algorithm several epochs before concluding the application of the averaged perceptron algorithm (step 528). After the training module 20 completes the application of the averaged perceptron algorithm (step 528), the training module 20 can begin a new active learning phase 504 beginning with the provision of an additional un-annotated corpus at step 520. Alternatively, the new active learning phase can continue to operate on sentences from the original or any previously analyzed corpus.

The performance of name tagging systems are typically scored according to a "F-measure," which is defined as the geometric mean of a system's recall and precision performance scores. Assume a name tagger only utilizes two classifications, None and Name. The recall performance score for such a name tagger corresponds to the percentage of names, which may include one or more words, in a corpus that the name tagger identifies. For example, if a corpus includes 100 names, and the name tagger identifies 80 of them, then the name tagger has achieved a recall performance of 80%. The precision performance score corresponds to the percent of the total names tagged by the name tagger which were properly tagged. For example, in detecting the 80 names in the above example, the name tagger may actually have tagged 110 words or word groups as being names (i.e., 30 names were tagged incorrectly). In this situation, the name tagger achieved a precision performance score of 73%. For a name tagging system having such performance scores, the corresponding F-measure is equal to approximately 0.76.

Experiments were carried out comparing the IE system 10 described above to other information extraction systems having different information extraction models and trained by other methods. Each experiment was carried out for varying sizes of annotated corpora. In the experiments, to simulate the active learning phase 502 of the training method for the IE system 10, the training module 20 utilized a second annotated corpus instead of the un-annotated corpus 28. The training module presented the sentences from the second annotated corpus (stripped of its annotations) to the evaluation module 114. Instead of receiving manual trainer annotations for the sentences identified from the second annotated corpus for trainer input, the training module compared the predicted tags for the selected sentences to the annotations already provided in the second annotated corpus. The cluster tree 106 used for the experiments was derived from the Wall Street Journal portion of the Continuous Speech Recognition (CSR-III) corpus, containing about 100 million words of newswire text.

Figure 7:
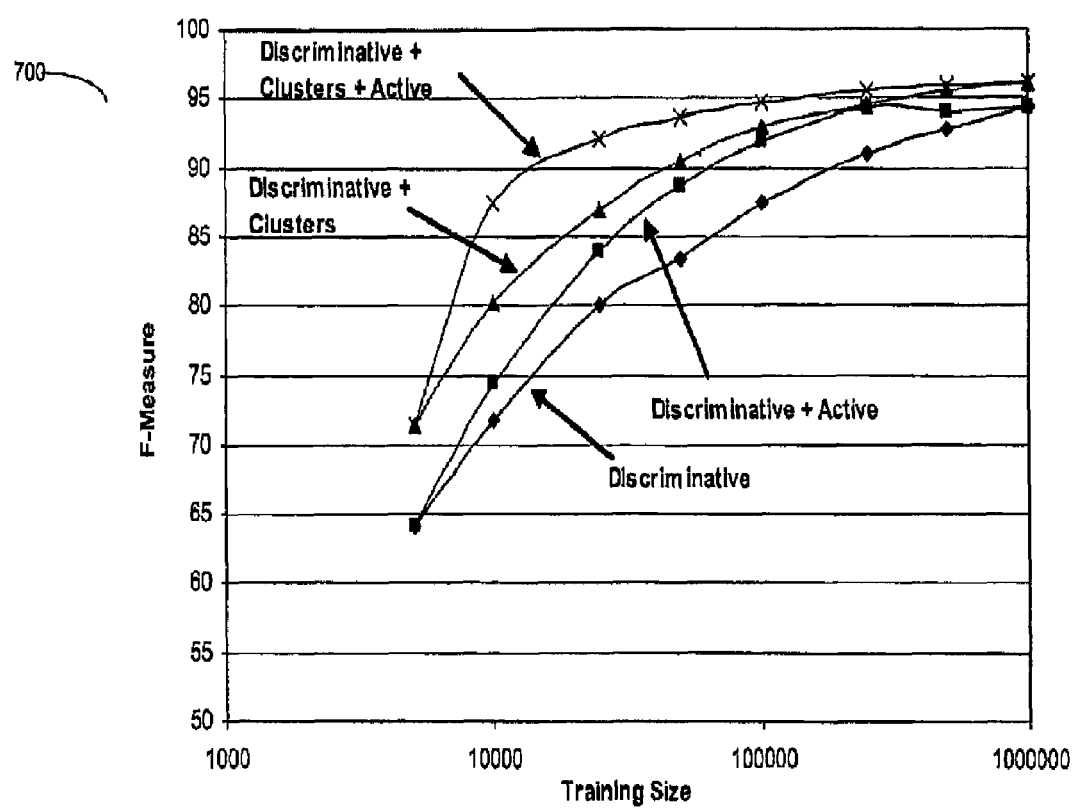
FIG. 7 is a graph of a performance experiment comparing the information extraction system depicted in FIG. 1 against other information extraction systems employing discriminative models.
Figure 8:
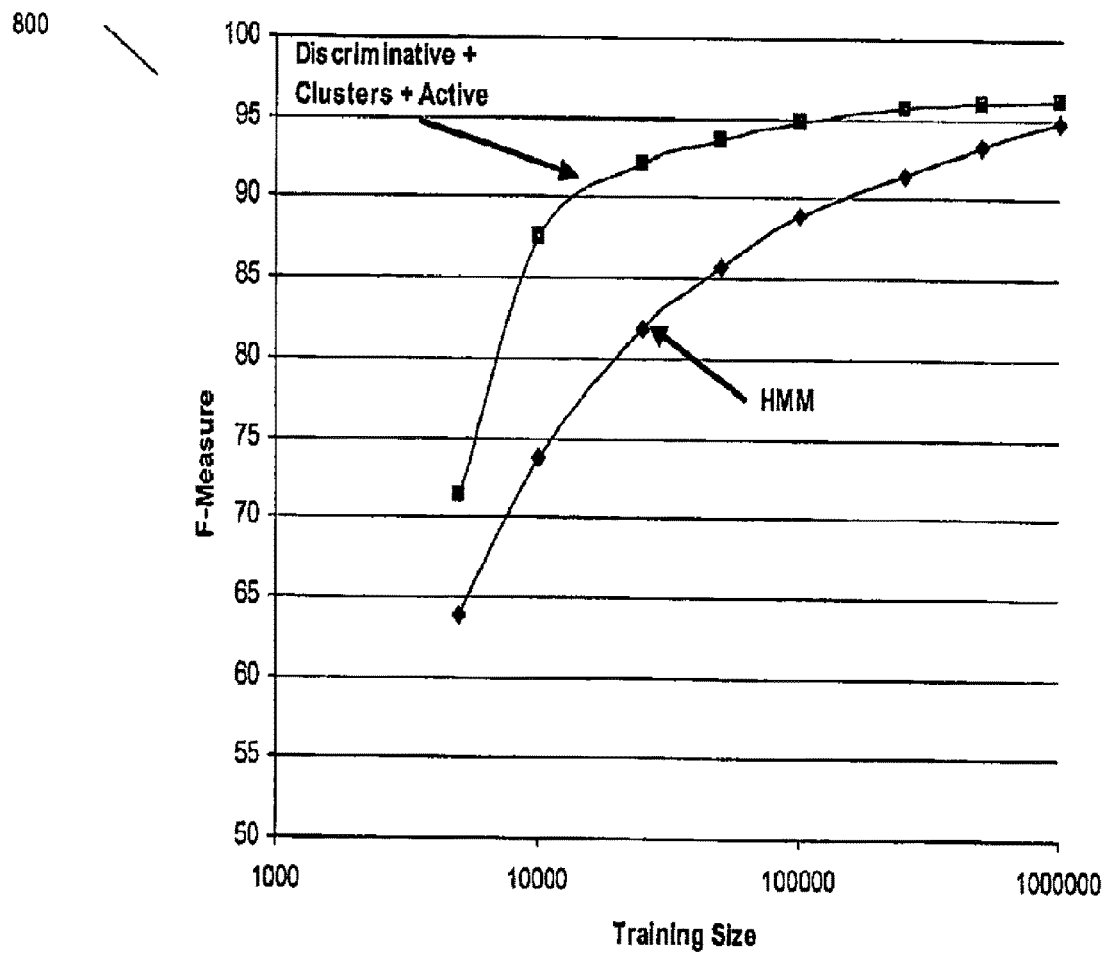
FIG. 8 is a graph of a performance experiment comparing the information extraction system depicted in FIG. 1 against an information extraction system using a generative model.

FIGS. 7-8 depict the results of those experiments. FIG. 7 is a graph 700 depicting the experimental F-measure results of a comparison of the IE system 10 to other information extraction systems which employ discriminative models. The graph 700 includes four sets of data points corresponding to F-measures for the IE system 10, a system using a discriminative model without cluster context features or active learning, an information system using a discriminative model using cluster context features, but not active learning, and a system using a discriminative model and active learning, but not cluster context features. Each system was tested using multiple sizes of annotated corpora. Particularly with smaller annotated corpora (for example, a corpus including approximately only 10,000 annotated words), the IE system 10 performed substantially better than the three other systems, yielding an F-Measure of approximately 0.88. The remaining systems, being trained on similarly sized corpora, yielded F-Measures of approximately 0.71, 0.74, and 0.80, respectively. The other systems required between 10-100 times the amount of annotated text before they achieved the F-Measure achieved by the IE system 10 using only 10,000 words of annotated text.

FIG. 8 is a graph 800 comparing the performance of the IE system 10 to a name tagging system believed, at the time the experiments took place, to be using a state of the art generative model. The data in graph 800 indicates that the system using a generative model required training on nearly 1 million annotated words to achieve performance on par with the IE system 10 being trained on only 10,000 annotated words.

The invention may be embodied in other specific forms without departing from the spirit or essential characteristics thereof. The forgoing embodiments are therefore to be considered in all respects illustrative, rather than limiting of the invention.

What is claimed is:

1. A system for training an information extraction model, the information extraction model capable of allowing a user to request information to be extracted from a user-supplied input, the system comprising:
    (a) a baseline training module implemented as computer readable instructions stored on one or more computer-readable storage devices and executable on one or more computers, the baseline training module programmed to:
        (i) receive an annotated corpus of text, the annotated corpus of text being associated with classifications and tags for each word in the annotated corpus of text and an annotated path for the classifications and tags;
        (ii) pass each sentence contained within the annotated corpus of text to an evaluation module, the evaluation module determining classifications and tags for each word within the annotated corpus of text based on data stored in a feature weight table and in a cluster tree, the evaluation module predicting a path for the classifications and tags;
        (iii) compare the predicted path with the annotated path; and
        (iv) if the predicted path and the annotated path match, the baseline training module skips to the next sentence, and if the predicted path and the annotated path do not match, the baseline training module adjusts the feature weights in the feature weight table corresponding to the unmatched paths; and
    (b) an active training module implemented as computer readable instructions stored on one or more computer-readable storage devices and executable on one or more computers, the active training module programmed to:
        (i) receive an unannotated corpus of text;
        (ii) pass each sentence contained within the unannotated corpus of text to the evaluation module, the evaluation module determining classifications and tags for each word within the unannotated corpus of text based on data stored in the feature weight table and in the cluster tree;
        (iii) calculate a confidence score indicating the confidence the evaluation module has in its tagging decisions for each sentence;
        (iv) select a subset of the sentences for review based on the confidence scores;
        (v) send the subset of sentences to at least one active learning user interface for review;
        (vi) receive, from the at least one active learning user interface, instructions to update the feature weights in the feature weight table based on the review; and
        (vii) update the feature weights in the feature weight table with the received instructions.

2. The system for training an information extraction model of claim 1 wherein the feature weight table stores weights corresponding to each of the features for each classification and tag in the information extraction model.

3. The system for training an information extraction model of claim 1 wherein the feature weights in the feature weight table are updated by applying an averaged perceptron algorithm to the received instructions.

4. The system for training an information extraction model of claim 3 wherein, to maintain the averaged perceptron, the feature weight table stores a history of feature weights and an average historical weight of each feature in the feature weight table.

5. The system for training an information extraction model of claim 1 wherein, in the baseline training module, an averaged perceptron algorithm manipulates feature weights in response to detecting predicted paths that fail to match the annotated paths in the annotated corpus of text.

6. The system for training an information extraction model of claim 1 wherein the active training module cancels the feature weights derived from baseline training and applies an averaged perceptron algorithm to an expanded training set.

7. The system for training an information extraction model of claim 1 wherein to adjust the feature weights, the active training module increments the feature weights corresponding to each of the tags in the annotated path and decrements the feature weights corresponding to the each of the tags in an incorrect predicted path.

8. The system for training an information extraction model of claim 1 wherein, if the feature weight changes, the active training module stores a new feature weight and calculates and stores a new average weight for the feature in the feature weight table.

9. The system for training an information extraction model of claim 1 wherein the confidence score for a given sentence is proportional to a likelihood determined for a selected path through a corresponding lattice.

10. The system for training an information extraction model of claim 1 wherein the confidence score for a sentence is proportional to a difference in likelihoods assigned to two paths through a lattice having the highest likelihood scores.

11. The system for training an information extraction model of claim 1 wherein the active training module selects a predetermined number of sentences with the lowest confidence scores.

12. The system for training an information extraction model of claim 1 wherein the active training module selects all sentences having confidence scores below a threshold value.

13. The system for training an information extraction model of claim 1 wherein the active training module selects the sentences having confidence scores that fall in a lowest predetermined percent of confidence scores.

14. The system for training an information extraction model of claim 1 wherein the active training module selects sentences for review based on a frequency with which words in each reviewed sentence appear in a training set.

15. The system for training an information extraction model of claim 1 wherein the active training module selects sentences for review based on a combination of the confidence scores and frequency with which words in each reviewed sentence appear in a training set.

\* \* \* \* \*